United States Patent
Ayuzawa et al.

(10) Patent No.: US 9,458,933 B2
(45) Date of Patent: Oct. 4, 2016

(54) COMBINATION OIL RING

(75) Inventors: Noriaki Ayuzawa, Chiyoda-ku (JP);
Masahide Hama, Chiyoda-ku (JP);
Yutaka Kitazume, Chiyoda-ku (JP)

(73) Assignee: TPR Co., Ltd., Tokyo (JP)

( * ) Notice: Subject to any disclaimer, the term of this patent is extended or adjusted under 35 U.S.C. 154(b) by 0 days.

(21) Appl. No.: 13/042,940

(22) Filed: Mar. 8, 2011

(65) Prior Publication Data
US 2011/0221141 A1    Sep. 15, 2011

(30) Foreign Application Priority Data

Mar. 10, 2010   (JP) .................................. 2010-052743

(51) Int. Cl.
*B60T 11/236* (2006.01)
*F16J 9/06* (2006.01)

(52) U.S. Cl.
CPC ....................................... *F16J 9/068* (2013.01)

(58) Field of Classification Search
USPC ................. 277/434, 467, 469–481
See application file for complete search history.

(56) References Cited

U.S. PATENT DOCUMENTS

| | | | | |
|---|---|---|---|---|
| 2,854,301 A | * | 9/1958 | Lutz ............................. | 267/1.5 |
| 2,904,377 A | * | 9/1959 | Endres et al. ................ | 277/480 |
| 3,759,148 A | * | 9/1973 | Geffroy .......................... | 92/160 |
| 3,814,444 A | | 6/1974 | Johnson et al. | |
| 4,111,437 A | * | 9/1978 | Saylor .......................... | 277/435 |
| 4,115,959 A | * | 9/1978 | McCormick ................... | 51/295 |
| 4,194,747 A | * | 3/1980 | Nisper .......................... | 277/481 |
| 4,429,885 A | * | 2/1984 | Chiba et al. .................. | 277/480 |
| 4,542,907 A | * | 9/1985 | Chiba et al. .................. | 277/479 |
| 4,548,416 A | * | 10/1985 | Maeda ........................... | 277/444 |
| 4,762,329 A | * | 8/1988 | Kooroki ........................ | 277/479 |
| 5,001,965 A | | 3/1991 | Ruddy et al. | |
| 5,129,661 A | * | 7/1992 | Ono et al. .................... | 277/479 |

(Continued)

FOREIGN PATENT DOCUMENTS

| | | |
|---|---|---|
| CN | 86100808 | 8/1986 |
| CN | 1226633 | 8/1999 |

(Continued)

OTHER PUBLICATIONS

European Search Report for corresponding application No. EP 11 15 6601 mailed Jun. 15, 2011.

(Continued)

*Primary Examiner* — Kristina Fulton
*Assistant Examiner* — Eugene G Byrd
(74) *Attorney, Agent, or Firm* — Merchant & Gould P.C.

(57) ABSTRACT

A combination oil ring prevented from freeze up of the side rails and spacer expander, that is, a combination oil ring of the present invention provided with a top and bottom pair of side rails 11 and 12 and a spacer expander 13 having large numbers of top pieces 14 and bottom pieces arranged separated in the axial direction and circumferential direction and alternating in the circumferential direction, connecting pieces 16 connecting adjoining top pieces 14 and bottom pieces 15, and ear parts 17 and 18 formed rising up at the inner circumference side ends of the top pieces 14 and bottom pieces 15 for pushing against the side rails 11 and 12, in which combination oil ring 10, grooves 19 and 20 are formed in at least one surfaces of top surfaces of the top pieces 14 and bottom surfaces of the bottom pieces 15, and through holes 17*a* and 18*a* by which the grooves 19 and 20 are communicated are formed in the ear parts 17 and 18.

6 Claims, 3 Drawing Sheets

(56) References Cited

U.S. PATENT DOCUMENTS

| | | | | |
|---|---|---|---|---|
| 5,195,758 | A * | 3/1993 | Erway | 277/480 |
| 5,238,255 | A | 8/1993 | Sytsma | |
| 5,794,941 | A * | 8/1998 | Lahrman | 277/441 |
| 6,283,478 | B1 | 9/2001 | Kumai et al. | |
| 7,036,823 | B2 * | 5/2006 | Takiguchi et al. | 277/434 |
| 7,044,472 | B2 * | 5/2006 | Takahashi et al. | 277/434 |
| 2002/0070507 | A1 * | 6/2002 | Heraud et al. | 277/434 |
| 2004/0262847 | A1 * | 12/2004 | Inoue | 277/443 |
| 2006/0027976 | A1 * | 2/2006 | Usui | 277/434 |
| 2006/0061043 | A1 * | 3/2006 | Takahashi et al. | 277/434 |
| 2006/0113730 | A1 * | 6/2006 | Suzuki et al. | 277/434 |
| 2008/0122185 | A1 * | 5/2008 | Katou | 277/434 |

FOREIGN PATENT DOCUMENTS

| | | |
|---|---|---|
| EP | 0 486 320 | 5/1992 |
| GB | 2 235 518 | 3/1991 |
| JP | 2-31559 | 8/1990 |
| JP | 2001-132840 | 5/2001 |

OTHER PUBLICATIONS

Information Statement (front page only) for corresponding application No. JP 2010-52743 submitted Aug. 3, 2012.
Chinese Office Action for corresponding Chinese Application No. 20111057131.X mailed Aug. 5, 2014 (12 pages). English translation provided.

* cited by examiner

COMBINATION OIL RING

This application claims benefit of Serial No. 2010-052743, filed 10 Mar. 2010 in Japan and which application is incorporated herein by reference. To the extent appropriate, a claim of priority is made to the above disclosed application.

TECHNICAL FIELD

The present invention relates to a three-piece type combination oil ring.

BACKGROUND ART

If using a three-piece type combination oil ring provided with a top and bottom pair of side rails and a spacer expander arranged between the same, unburned carbon or carbon produced from the burnt products of the lubricating oil tend to deposit between the spacer expander and side rails.

If this advances, the deposits cause the side rails and spacer expander to freeze up, the side rails can no longer mold to the shape of the cylinder bore, and the predetermined performance as an oil ring can no longer be exhibited. As opposed to this, in Japanese Utility Model Publication (B2) No. 2-31559, at center parts having the substantially flat surfaces between peak parts and valley parts in the expander, holes of sizes sufficient for passage of the deposits are formed.

SUMMARY OF INVENTION

However, in Japanese Utility Model Publication (B2) No. 2-31559, since holes are formed at the center parts having the substantially flat surfaces between the peak parts and valley parts in the expander, the rigidity of the expander sometimes is insufficient.

The present invention has as its object the prevention of freeze up of the side rails and spacer expander of the combination oil ring.

To solve the above problem, the present invention adopts the following technical solution.

That is, the present invention provides a combination oil ring provided with a top and bottom pair of side rails and a spacer expander arranged between the same, the spacer expander having large numbers of top pieces and the bottom pieces arranged separated in the axial direction and circumferential direction and alternating in the circumferential direction, connecting pieces connecting adjoining top pieces and bottom pieces, and ear parts formed rising up at the inner circumference side ends of the top pieces and bottom pieces for pushing against the side rails, characterized in that:

grooves are formed in at least one surfaces of top surfaces of the top pieces and bottom surfaces of the bottom pieces, and through holes by which the grooves are communicated are formed in the ear parts.

Preferably, the grooves extend in the radial direction, are not closed at the outer circumference sides, and open into space parts.

Preferably, outer circumference side ends of the top pieces and bottom pieces are formed higher so as to form side rail support parts. In this case, the grooves are formed in at least one surfaces of top surfaces of the top pieces and bottom surfaces of the bottom pieces at parts other than the side rail support parts. Alternatively, the grooves are formed in at least one surfaces of top surfaces of the top pieces and bottom surfaces of the bottom pieces at parts other than the side rail support parts and at the side rail support parts.

In the above, preferably the grooves formed at parts other than the side rail support parts extend in the radial direction, are not closed at the outer circumference sides, and open at space parts facing the side rail support parts. Further, preferably the grooves formed at the side rail support parts extend in the radial direction and open at inside/outside ends of the side rail support parts.

Preferably, the grooves are formed by plastic working.

According to the present invention, the sizes of the through holes of the ear parts which the space parts between the side rails and spacer expander face can be formed larger, by exactly the amount of the grooves, than the flat case with no grooves formed, so it becomes easy to discharge deposits between the spacer expander and side rails from the through holes of the ear parts of the spacer expander and becomes possible to prevent freeze up of the side rails and spacer expander due to the deposits.

By having the grooves extend in the radial direction, having them not closed at the outer circumference sides, and having them open at the space parts, oil can flow in from the openings and flow from the outer circumference sides to the inner circumference sides, so it becomes harder for deposits to build up, deposits are easily discharged from the through holes of the ear parts, and freeze up of the side rails and spacer expander due to the deposits can further be prevented.

When the outer circumference side ends of the top pieces and bottom pieces are formed higher so as to form side rail support parts, by having the grooves formed at the parts other than the side rail support parts not be closed at their outer circumference sides and having them open to the space parts facing the side rail support parts, oil can flow in from the openings and flow from the outer circumference sides to the inner circumference sides, so it becomes hard for deposits to build up, deposits are easily discharged from the through holes of the ear parts, and freeze up of the side rails and spacer expander due to the deposits can further be prevented. Further, similarly, by having the grooves formed at the side rail support parts extend in the radial direction and open to the inside and outside ends of the side rail support parts, oil can flow from the openings at the outer circumference sides and flow from the outer circumference sides to the inner circumference sides, so it becomes hard for deposits to build up, deposits are easily discharged from the through holes of the ear parts, and freeze up of the side rails and spacer expanded due to the deposits can further be prevented.

By having the grooves formed by plastic working, the effects on the rigidity can be reduced.

BEST MODE FOR CARRYING OUT THE INVENTION

Below, one embodiment of the present invention will be explained based on FIG. 1 to FIG. 2.

Figure 1:
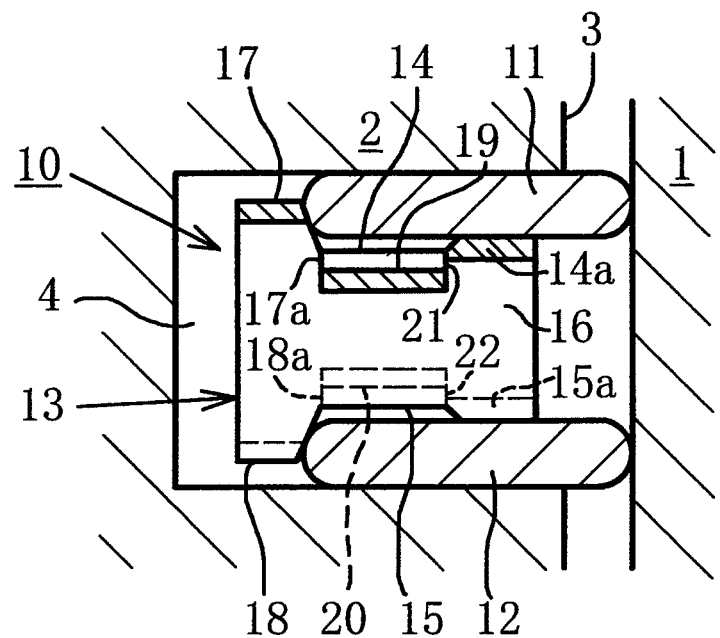
FIG. 1 is a cross-sectional view showing one embodiment of the present invention and showing the state where a piston mounting the combination oil ring is inserted into a cylinder.
Figure 2:
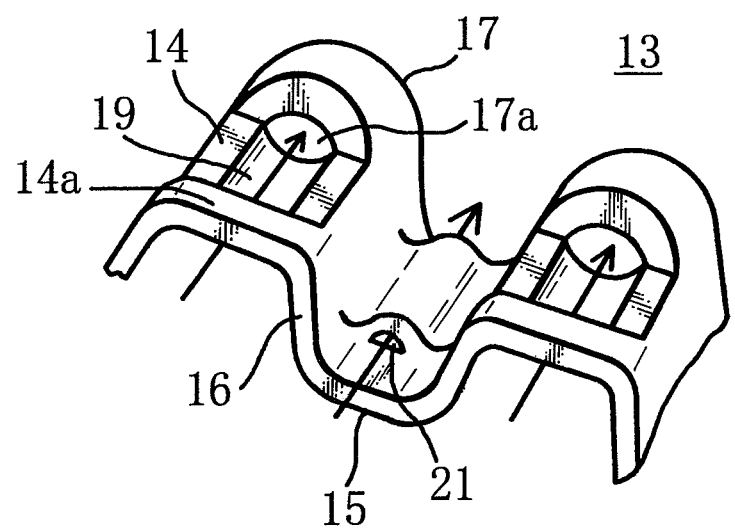
FIG. 2 is a perspective view showing part of a spacer expander.

In FIG. 1, a combination oil ring 10 is attached to an oil ring groove 4 formed at the outer circumferential surface 3 of a piston 2 in a cylinder 1. The combination oil ring 10 is a three-piece type steel combination oil ring and is comprised of a top and bottom pair of side rails 11 and 12 and a spacer expander 13 arranged between the same.

The side rails 11 and 12 are ring-shaped, plate-like rails provided with mating openings.

The spacer expander 13 (see FIG. 1 and FIG. 2) is comprised of a large number of regularly repeating elements connected to form a wave shape in the axial direction. The spacer expander 13 has a large number of horizontal top pieces 14 and bottom pieces 15 arranged separated in the axial direction and circumferential direction and alternating in the circumferential direction. Adjoining top pieces 14 and bottom pieces 15 are connected by connecting pieces 16. The outer circumference side ends of the top pieces 14 and the bottom pieces 15 are formed higher than the inner circumference sides so as to form support parts 14a and 15a of the side rails 11 and 12. The inner circumference side ends of the top pieces 14 and the bottom pieces 15 are formed with ear parts 17 and 18 raised up in arc shapes for pushing against the side rails 11 and 12. They are formed with through holes 17a and 18a at the root parts of the ear parts 17 and 18.

At the top surfaces of the top pieces 14 and the bottom surfaces of the bottom pieces 15 of the spacer expander 13, the parts other than the side rail support parts 14a and 15a are formed with grooves 19 and 20 extending linearly in the radial direction. These grooves 19 and 20 are formed by deforming predetermined parts of the top pieces 14 and the bottom pieces 15 by plastic working into cross-sectional arc shapes. The grooves 19 and 20 have inner circumference side ends connected to through holes 17a and 18a at the root parts of the ear parts 17 and 18 and have outer circumference side ends opening at space parts facing the side rail support parts 14a and 15a. Reference numerals 21 and 22 are openings. The cross-sectional shapes of the grooves 19 and 20 are shown as arc shapes, but the invention is not particularly limited to this. Other, for example, inverted trapezoidal shapes or V-shapes may be used. The width dimensions of the grooves 19 and 20 are made one-quarter of the circumferential direction widths of the top pieces 14 and bottom pieces 15 to three-quarters of the circumferential direction widths, but the invention is not particularly limited to this. Further, the dimensions from the surfaces of the side rails 11 and 12 to the groove bottoms are for example 0.05 to 0.6 mm or so.

The spacer expander 13 is designed to be mounted, in a compressed state, in the oil ring groove 4 of a piston 2 with its two mating opening ends abutting against it and give an expansion force outward in the radial direction. The top and bottom side rails 11 and 12 are held separated by the side rail support parts 14a and 15a of the top and bottom pieces 14 and 15 in the up-down (axial direction). The top and bottom ear parts 17 and 18 push against the inner circumferential surfaces of the top and bottom side rails 11 and 12 so as to make the outer circumferential surfaces of the side rails 11 and 12 closely contact the inner walls of the cylinder 1. In this way, the outer circumferential surfaces of the top and bottom side rails 11 and 12 are pushed against the inner walls of the cylinder 1 and scrape off the oil of the inner walls of the cylinder 1.

The combination oil ring 10 of the present embodiment, in the above way, is formed with grooves 19 and 20 at the top pieces 14 and the bottom pieces 15 of the spacer expander 13, so the sizes of the through holes 17a and 18a provided at the root parts of the ear parts 17 and 18 and facing the space parts between the side rails 11 and 12 and the spacer expander 13 can be formed larger by exactly the amounts of the grooves 19 and 20 compared with the flat case with no grooves formed, so deposits between the top and bottom pieces 14 and 15 of the spacer expander 13 and the side rails 11 and 12 are easily discharged from the through holes 17a and 18a of the ear parts 17 and 18 of the spacer expander 13 and freeze up of the side rails 11 and 12 and spacer expander 13 due to the deposits can further be prevented.

Further, the grooves 19 and 20 extend in the radial direction and are not closed at the outer circumference sides. They open at the space parts facing the side rail support parts 14a and 15a. Due to this, as shown by the arrows in FIG. 2, oil can flow in from the openings 21 and 22 and flow from the outer circumference sides to the inner circumference sides, so it becomes harder for deposits to build up, deposits are easily discharged from the through holes 17a and 18b of the ear parts 17 and 18, and freeze up of the side rails 11 and 12 and spacer expander 13 due to the deposits can further be prevented.

Note that, in the above embodiment, the outer circumference side ends of the grooves 19 and 20 are open, but the ends may also be configured to close. However, this differs from the above embodiment in the point of the flow of oil.

Figure 3:
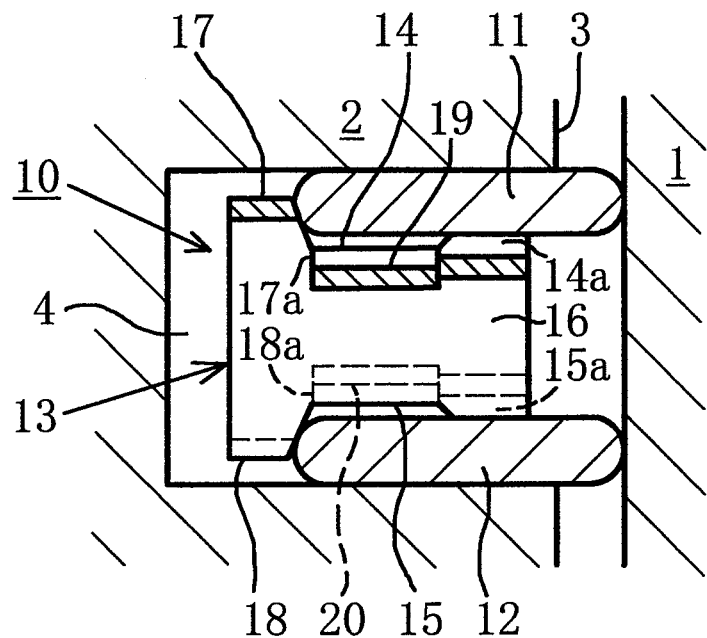
FIG. 3 is a cross-sectional view showing another embodiment of the present invention and showing the state where a piston mounting the combination oil ring is inserted into a cylinder.
Figure 4:
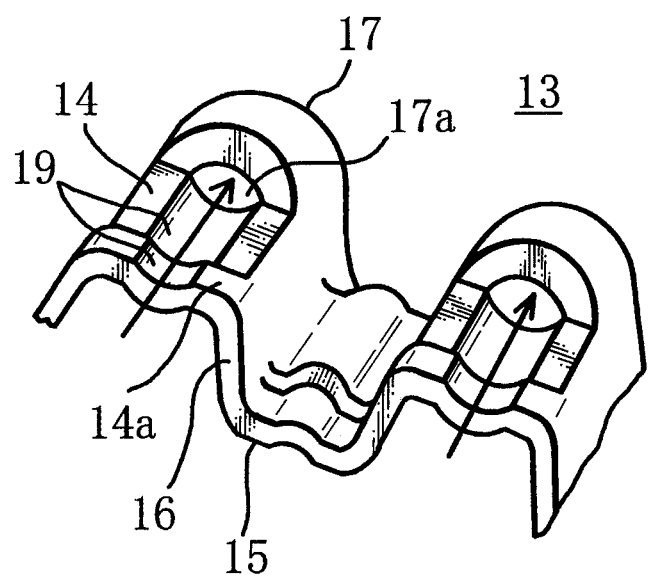
FIG. 4 is a perspective view showing part of a spacer expander.

FIG. 3 to FIG. 4 shows another embodiment of the present invention. The combination oil ring 10 of the present embodiment differs from the combination oil ring of the above embodiment in the following points of the grooves 19 and 20. The rest of the configuration is the same as the above embodiment.

In the present embodiment, the side rail support parts 14a and 15a of the spacer expander 13 are also formed with grooves. That is, at the top surfaces of the top pieces 14 and the bottom surfaces of the bottom piece 15 of the spacer expander 13, both the parts other than the side rail support parts 14a and 15a and the side rail support parts 14a and 15a are formed with grooves 19 and 20 extending linearly in the radial direction. The grooves 19 and 20, at the parts other than the side rail support parts 14a and 15a, have inner circumference side ends communicated with through holes 17a and 18a of the root parts of the ear parts 17 and 18 and have outer circumference side ends extending to the side rail support parts 14a and 15a and not opened, but closed. Further, the grooves 19 and 20 extend in the radial direction at the side rail support parts 14a and 15a and open at the inside and outside ends of the side rail support parts 14a and 15a.

The combination oil ring 10 of the present embodiment has the same actions and effects as the above embodiment.

However, the oil, as shown by the arrows in FIG. 4, can flow in from the openings at the outer circumference ends of the groove 19 and 20 parts formed at the side rail support parts 14a and 15a and flow from the outer circumference sides to the inner circumference sides.

Note that, in the above embodiment, the outer circumference side ends of the groove 19 and 20 parts formed at parts other than the side rail support parts 14a and 15a are closed, but, in the same way as the initial embodiment, it is also possible to configure the ring so that the grooves open at the space parts facing the side rail support parts 14a and 15a needless to say.

Figure 5:
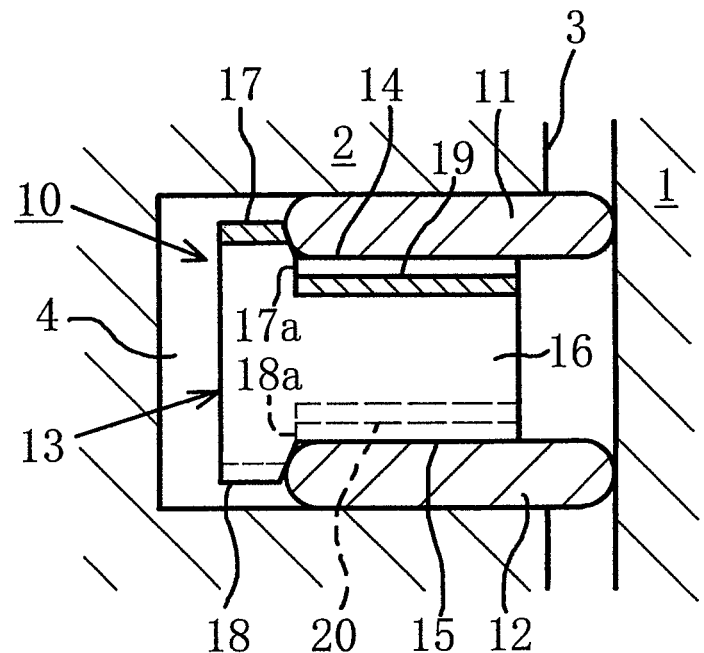
FIG. 5 is a cross-sectional view showing still another embodiment of the present invention and showing the state where a piston mounting the combination oil ring is inserted into a cylinder.
Figure 6:
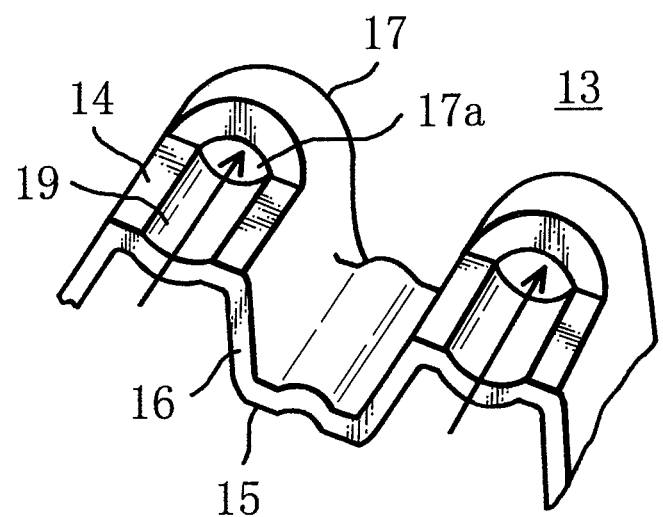
FIG. 6 is a perspective view showing part of a spacer expander.

FIG. 5 to FIG. 6 show still another embodiment of the present invention. The combination oil ring 10 of the present embodiment differs from the combination oil ring of the first embodiment in the point of not having the side rail support parts. Also, the configuration of the grooves 19 and 20 differs in the following points. The rest of the configuration is the same as the first embodiment.

The spacer expander 13 of the present embodiment does not have the top pieces 14 and the bottom pieces 15 with outer circumference side ends with higher side rail support parts. The top surfaces of the top pieced 14 and the bottom surfaces of the bottom pieces 15 of the spacer expander 13 are formed with grooves 19 and 20 extending linearly in the radial direction. The grooves 19 and 20 have inner circumference side ends communicated with through holes 17a and 18a at the root parts of the ear parts 17 and 18 and have outer circumference side ends opening to the space parts.

The combination oil ring 10 of the present embodiment has the same actions and effects as the first embodiment. However, oil, as shown by the arrows of FIG. 6, can flow from the openings of the outer circumference ends of the grooves 19 and 20 and flow from the outer circumference sides to the inner circumference sides.

The spacer expander 13 of the present embodiment can be formed by plastic working. That is, by plastic working the plate member, it is possible to form a spacer expander 13 having a wave shape in the axial direction which has top and bottom pieces 14 and 15 formed with ear parts 17 and 18 and grooves 19 and 20 or side rail support parts 14a and 15a.

REFERENCE SIGNS LIST

1 . . . cylinder
2 . . . piston
3 . . . piston outer circumferential surface
4 . . . oil ring grooves
10 . . . combination oil ring
11, 12 . . . side rails
13 . . . spacer expander
14 . . . top pieces
15 . . . bottom pieces
14a, 15a . . . side rail support parts
16 . . . connecting piece
17, 18 . . . ear parts
17a, 18a . . . through holes
19, 20 . . . grooves
21, 22 . . . openings

The invention claimed is:

1. A combination oil ring provided with a top and bottom pair of side rails and a spacer expander arranged between the same, said spacer expander having:
top pieces and bottom pieces arranged separated in the axial direction and circumferential direction and alternating in the circumferential direction, the top pieces and the bottom pieces having outer circumference side ends and inner circumference side ends with a central portion situated radially between the outer circumference side ends and the inner circumference side ends,
connecting pieces connecting the top pieces and the bottom pieces,
ear parts formed at the inner circumference side ends of said top pieces and bottom pieces for pushing against inner circumferential surfaces of the top and bottom side rails, wherein the ear parts extend above the central portions of the top pieces and below the central portions of the bottom pieces,
side rail support parts formed at the outer circumference side ends of the top pieces and the bottom pieces, wherein the outer circumference side ends extend above the central portions of the top pieces and below the central portions of the bottom pieces so as to form the side rail support parts,
first support surfaces defined at least at ends of the side rail support parts in the circumferential direction configured to respectively support the top and bottom side rails thereon,
second surfaces defined at least at the ends of the side rail support parts in the circumferential direction opposite the first support surfaces in the axial direction,
grooves formed in the central portions extending linearly in the radial direction, the grooves defining through holes at root parts of the ear parts and defining openings at the outer circumference side ends, the grooves having concave groove floors,
wherein the second surfaces are spaced apart from the respective first support surfaces by a first distance, and the concave groove floors are spaced apart from the respective first support surfaces by a second distance that is greater than the first distance such that the second surfaces are closer to the respective first support surfaces than the concave groove floors.

2. A combination oil ring as set forth in claim 1, wherein grooves are formed in both surfaces of top surfaces of said top pieces and bottom surfaces of said bottom pieces at said side rail support parts, and
the grooves formed at said side rail support parts extend in the radial direction and open at the inside and outside ends of the side rail support parts.

3. A combination oil ring as set forth in claim 1, wherein said grooves are formed by plastic working.

4. A combination oil ring as set forth in claim 2, wherein said grooves are formed by plastic working.

5. A combination oil ring as set forth in claim 1, wherein the width dimensions of the grooves are made one quarter of the circumferential direction widths of the top pieces and bottom pieces to three-quarters of the circumferential direction widths,
the dimensions from the surfaces of the side rails and to the concave groove floors are 0.6 mm or less, and
the cross-sectional shapes of the grooves are at least one of: arc shapes, V-shapes, and inverted trapezoidal shapes.

6. A combination oil ring as set forth in claim 1, wherein:
each of the first support surfaces defines a planar surface extending across the respective side rail support part in the circumferential direction,
each of the second surfaces defines a planar surface extending parallel to the respective first support surface,
the concave groove floors extend beyond the second surfaces to form the openings at the outer circumference side ends, such that the openings at the outer circumference side ends extend below the second surfaces of the top pieces and above the second surfaces of the bottom pieces.

* * * * *